(12) United States Patent
Yang et al.

(10) Patent No.: US 8,620,052 B2
(45) Date of Patent: Dec. 31, 2013

(54) PROJECTION TRUNCATION PROCESSING FOR CBCT

(75) Inventors: Dong Yang, Pittsford, NY (US); Robert A. Senn, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 338 days.

(21) Appl. No.: 12/821,405

(22) Filed: Jun. 23, 2010

(65) Prior Publication Data

US 2011/0317894 A1 Dec. 29, 2011

(51) Int. Cl.
*G06K 9/00* (2006.01)
(52) U.S. Cl.
USPC .................................................... 382/131
(58) Field of Classification Search
USPC ............................................. 382/131
See application file for complete search history.

(56) References Cited

U.S. PATENT DOCUMENTS

| 5,270,926 A | 12/1993 | Tam |
| 5,999,587 A | 12/1999 | Ning et al. |
| 2006/0104407 A1 | 5/2006 | Zamyatin et al. |
| 2008/0219534 A1* | 9/2008 | Faul et al. ..................... 382/131 |

* cited by examiner

*Primary Examiner* — Neha Patel

(57) ABSTRACT

A method for 3-D volume image reconstruction of a subject. 2-D projection images are obtained over a range of scan angles, and one or more truncated images are identified from the obtained images. From each of the one or more truncated images, a corrected truncated image is formed by a repeated process of identifying a row of image data values in the one or more truncated images, assigning an extension length to one or both ends of the row according to the row location in the truncated image, and extending the truncated image data for the row of image data values by applying a row-dependent cosine function to each value in the extension length. A 3-D volume image is reconstructed using one or more of the corrected truncated images.

5 Claims, 22 Drawing Sheets

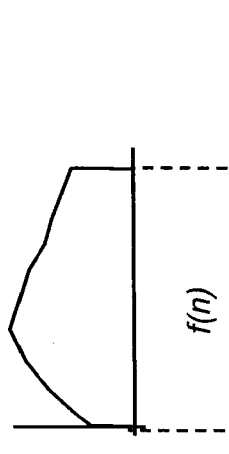
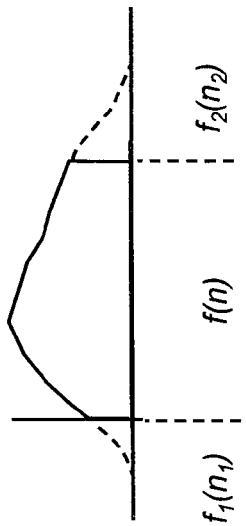
26
$f(n): n = \{1, 2, \cdots, N\}$, original truncated data
$\left\{\begin{array}{l} f_1(n_1) = f(1) \cdot \left\{\cos\left[\pi/2 \cdot \dfrac{(L-n_1)}{L}\right]\right\}: n_1 = \{0, 1, \cdots, L-1\}, \\ f_2(n_2) = f(N) \cdot \left\{\cos\left[\pi/2 \cdot \dfrac{(n_2-N)}{L}\right]\right\}: n_2 = \{N+1, N+2, \cdots, N+L\}, \end{array}\right.$
28
$g(t) = [f_1(n_1), f(n), f_2(n_2)], \quad t = \{1, 2, \cdots, N+2L\}$
FIG. 9

FIG. 11C Sagittal

FIG. 11B Coronal

FIG. 11A Axial

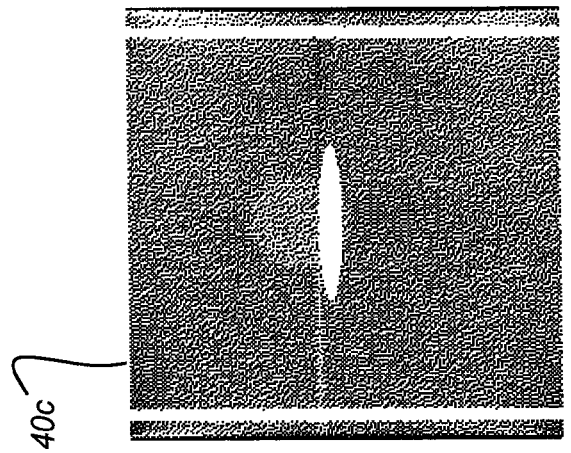
FIG. 17C Sagittal
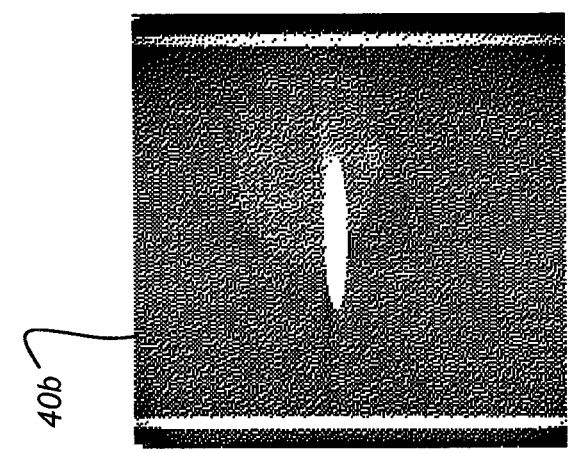
FIG. 17B Coronal
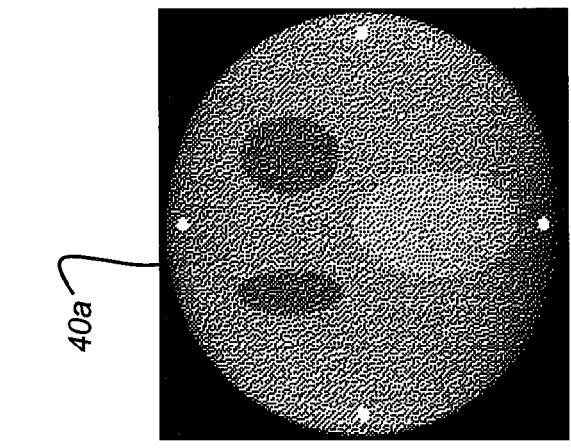
FIG. 17A Axial

PROJECTION TRUNCATION PROCESSING FOR CBCT

FIELD OF THE INVENTION

The invention relates generally to the field of diagnostic imaging and in particular to Cone-Beam Computed Tomography (CBCT) imaging. More specifically, the invention relates to a method for improved image processing for truncated CBCT image content.

BACKGROUND OF THE INVENTION

3-D volume imaging has proved to be a valuable diagnostic tool that offers significant advantages over earlier 2-D radiographic imaging techniques for evaluating the condition of internal structures and organs. 3-D imaging of a patient or other subject has been made possible by a number of advancements, including the development of high-speed imaging detectors, such as digital radiography (DR) detectors that enable multiple images to be taken in rapid succession.

Cone beam computed tomography (CBCT) or cone beam CT technology offers considerable promise as one type of diagnostic tool for providing 3-D volume images. Cone beam CT systems capture volume data sets by using a high frame rate flat panel digital radiography (DR) detector and an x-ray source, typically affixed to a gantry that revolves about the object to be imaged, directing, from various points along its orbit around the subject, a divergent cone beam of x-rays toward the subject. The CBCT system captures projection images throughout the source-detector orbit, for example, with one 2-D projection image at every degree of rotation. The projections are then reconstructed into a 3D volume image using various techniques. Among the most common methods for reconstructing the 3-D volume image are filtered back projection approaches.

Although 3-D images of diagnostic quality can be generated using CBCT systems and technology, there are technical challenges. For example, there can be a limited range of angular revolution of the x-ray source and detector with respect to the subject. A full 360 degree orbit is typically used for conventional CBCT imaging though sufficient information for image reconstruction can be obtained with a scan range that just exceeds 180 degrees by the angle of the cone beam itself, for example. However, sometimes it can be difficult to obtain much more than about 180 degree orbit for imaging the knee or other joints and other applications. Even with increased sampling resolution, this angular constraint limits how well a volume image can be reconstructed from its set of 2-D projection images, particularly where there is truncation in one or more of the 2-D projection images.

Image detector sizing for imaging of knee and joints can also be a problem. In some cases, a tradeoff must be made between using a larger image detector that can capture the full image of the subject from any angle, but has additional size and bulk, and a smaller, more portable detector that can be orbited more easily about the subject, but may not be capable of obtaining the complete image at every angle, resulting in image truncation.

Various methods have been used for compensating for image truncation in the projection images captured as part of the CBCT sequence. However, these earlier methods are hampered by problems related to computation efficiency and accuracy of reconstruction of the object that lies within the field of view (FOV). Other problems with known methods can include filter response anomalies and artifacts in the reconstructed image.

Thus, there is a need for improved truncation processing for CBCT images.

SUMMARY OF THE INVENTION

An object of the present invention is to provide an image processing method for partial scan CBCT imaging that compensates for image truncation in one or more of the projection images used to form the reconstructed volume image.

A further object of the present invention is to provide a method for data extrapolation for truncated image data that adapts to differing effects of truncation according to pixel row position.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for 3-D volume image reconstruction of a subject, executed at least in part on a computer and comprising: obtaining a plurality of 2-D projection images over a range of scan angles; identifying one or more truncated images from the obtained plurality of images; forming, from each of the one or more truncated images, a corrected truncated image by a repeated process comprising: (i) identifying a row of image data values in the one or more truncated images; (ii) assigning an extension length to one or both ends of the row according to the row location in the truncated image; (iii) extending the truncated image data for the row of image data values by applying a row-dependent cosine function to each value in the extension length; and reconstructing the 3-D volume image using one or more of the corrected truncated images.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 9 is a diagram showing calculations for truncated data extrapolation in one embodiment.

FIGS. 17A-17C show plan views of the Shepp-Logan phantom following truncation processing using extended partial scan weighting and adaptive projection truncation processing.

DETAILED DESCRIPTION OF THE INVENTION

Figure 1:
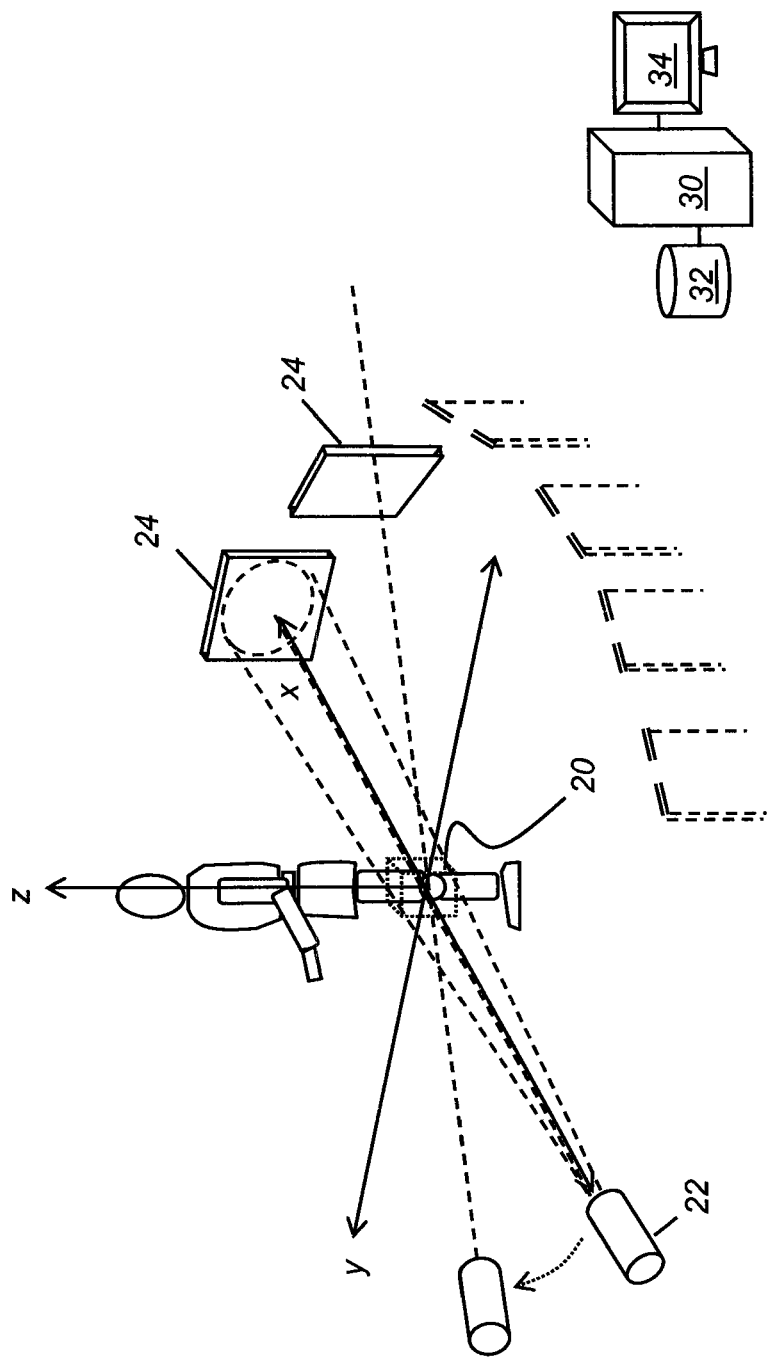
FIG. 1 is a schematic diagram showing components and architecture used for CBCT scanning.

The following is a detailed description of the preferred embodiments of the invention, reference being made to the drawings in which the same reference numerals identify the same elements of structure in each of the several figures.

The description of the present disclosure is directed to CBCT imaging of the human knee as an example application that can be served by embodiments of the method of the present invention. Embodiments of the present invention can be used for obtaining volume images from other types of subjects including other limbs, anatomy, or structures, particularly where there are constraints on the angular range of the source-detector orbit and where there is image truncation.

In the context of the present disclosure, the term "cosine function" has its conventional meaning as it would be used in the mathematical arts, relating to a function that can be expressed as a cosine of a corresponding variable.

In the drawings and text that follow, like components are designated with like reference numerals, and similar descriptions concerning components and arrangement or interaction of components already described are omitted. Where used, the terms "first", "second", and the like, do not denote any ordinal or priority relation, but are used to more clearly distinguish one element from another.

CBCT imaging apparatus and the imaging algorithms used to obtain 3-D volume images using such systems are well known in the diagnostic imaging art and are, therefore, not described in detail in the present application. Some exemplary algorithms for forming 3-D volume images from the source 2-D images, projection images that are obtained in operation of the CBCT imaging apparatus can be found, for example, in U.S. Pat. No. 5,999,587 entitled "Method of and System for Cone-Beam Tomography Reconstruction" to Ning et al. and in U.S. Pat. No. 5,270,926 entitled "Method and Apparatus for Reconstructing a Three-Dimensional Computerized Tomography (CT) Image of an Object from Incomplete Cone Beam Data" to Tam.

In typical applications, a computer or other type of dedicated logic processor for obtaining, processing, and storing image data is part of the CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to the present invention.

To more fully understand the methods of the present invention and the problems addressed, it is instructive to review principles and terminology used for CBCT image capture and reconstruction. Referring to the perspective view of FIG. 1, there is shown, in schematic form and using enlarged distances for clarity of description, the activity of a conventional CBCT imaging apparatus for obtaining the individual 2-D images that are used to form a 3-D volume image.

As shown in FIG. 1, a cone-beam radiation source 22 directs a cone of radiation toward a subject 20, such as a patient or other subject. A sequence of images is obtained in rapid succession at varying angles about the subject, such as one image at each 1-degree angle increment in a 200-degree orbit. A digital radiography (DR) detector 24 is moved to different imaging positions about subject 20 in concert with corresponding movement of radiation source 22. FIG. 1 shows a representative sampling of DR detector 24 positions to illustrate how these images are obtained relative to the position of subject 20. Once the needed 2-D projection images are captured in this sequence, a suitable imaging algorithm, such as filtered back projection or other conventional technique, is used for generating the 3-D volume image. Image acquisition and program execution are performed by a computer 30 or by a networked group of computers 30 that are in image data communication with DR detectors 24. Image processing and storage is performed using a computer-accessible memory 32. The 3-D volume image can be presented on a display 34.

Figure 2A:
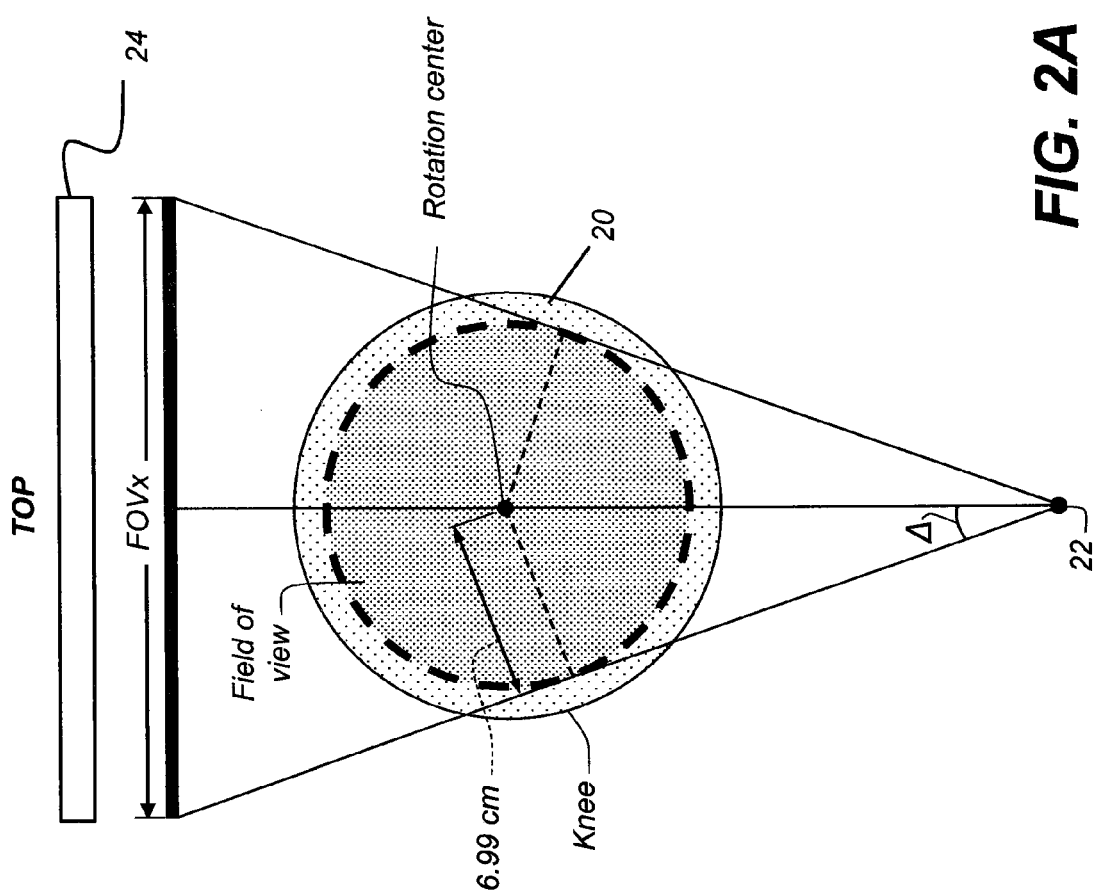
FIG. 2A is a top view showing the field of view of a CBCT imaging system.
Figure 2B:
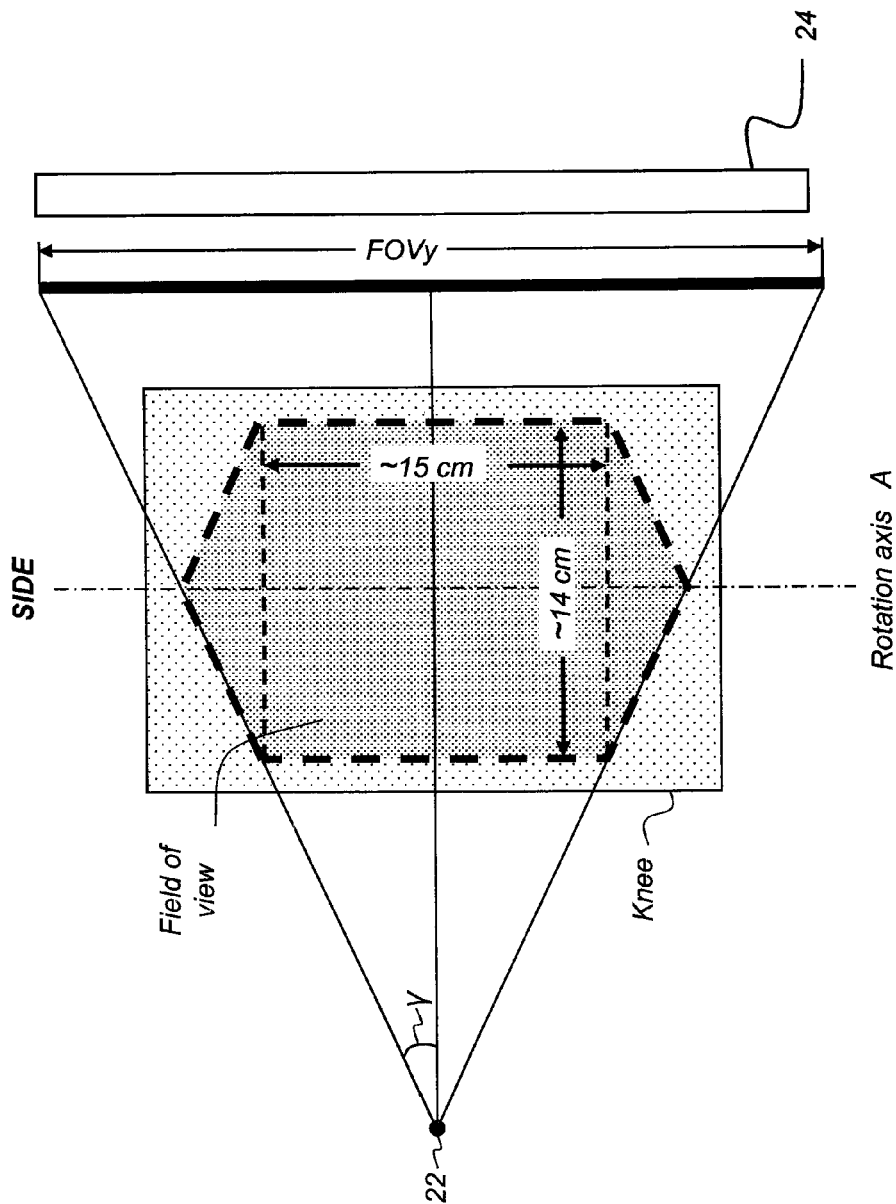
FIG. 2B is a side view showing the field of view of a CBCT imaging system.

The top and side views of FIGS. 2A and 2B show the field of view of a CBCT system and show how truncation can occur. Referring to the top view of FIG. 2A, a knee is shown in axial cross-section as subject 20. Revolution of x-ray source 22 and detector 24 is with respect to rotation axis A. The field of view FOVx provides image data to detector 24 at a given dimension. Truncation occurs when detector 24 is smaller than the projection of the subject in this direction, as shown in FIG. 2A. Similarly, in the side view of FIG. 2B, truncation occurs in the y-axis direction when the projection along FOVy exceeds the height of detector 24. The cone angle from the top view of FIG. 2A is given by $\Delta$. The cone angle from the side view of FIG. 2B is shown as $\gamma$.

Figure 3:
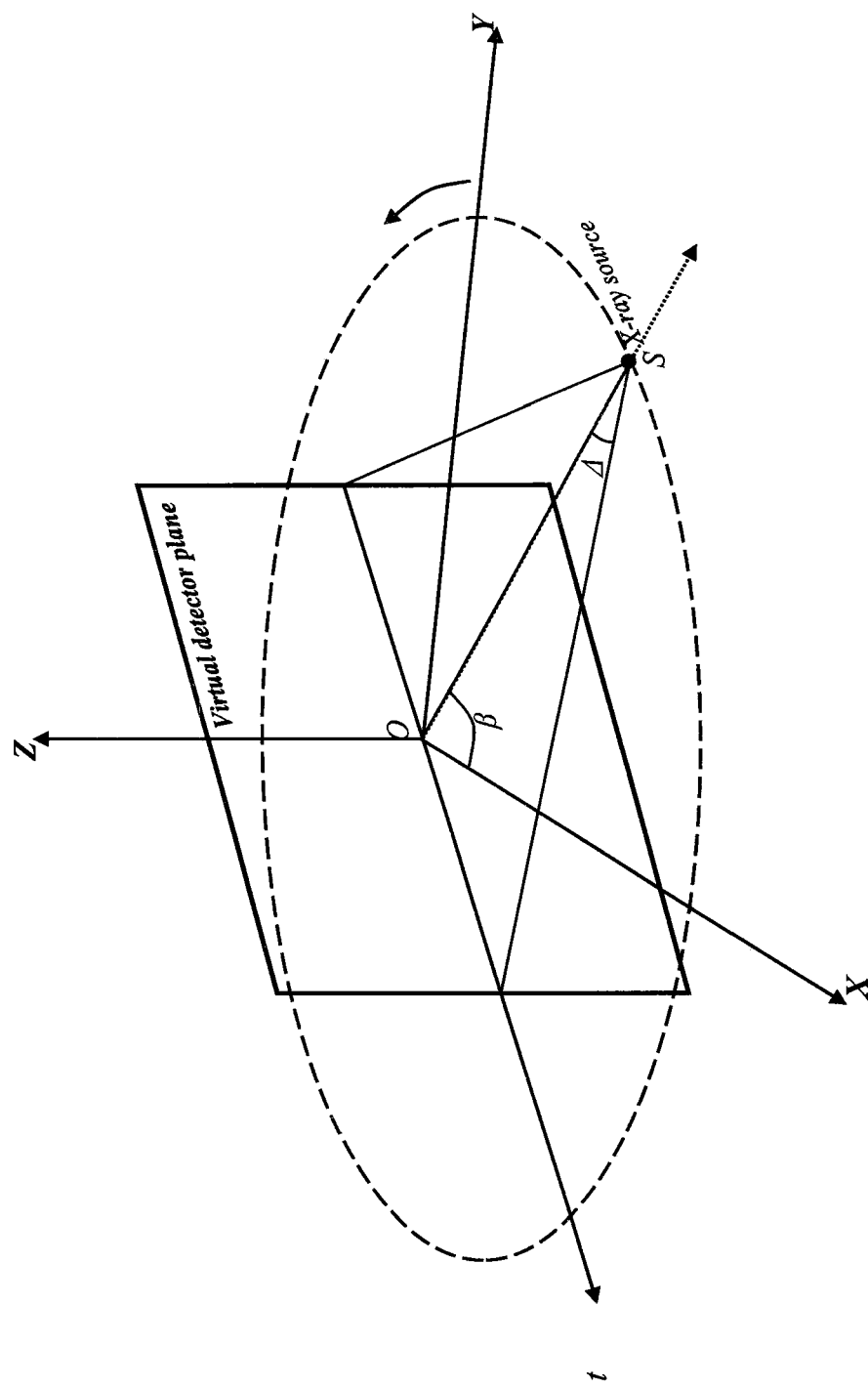
FIG. 3 is a perspective view that shows coordinate and angle assignments for conventional cone beam imaging.

The schematic diagram of FIG. 3 shows coordinate assignments that are conventionally used for CBCT imaging. Coordinates x, y, and z are given, fixed coordinates for the imaged subject. Coordinates (S, t, Z) are the changing coordinates that are associated with movement of the flat panel detector 24, corresponding to the virtual detector plane shown in FIG. 3. The central beam is through OS. Angle β is the scan angle that extends over the range

[0 degrees,180 degrees+2Δ]

wherein 0 degrees is parallel to the x axis.

It should be noted that there are limits to the angular range of the scan for knee imaging, because a portion of the circumference is blocked by the other knee and leg. As shown in FIG. 3, the scan orbit relative to the subject extends over a range of about 200 degrees, more precisely, 180 degrees+2Δ.

Figure 4:
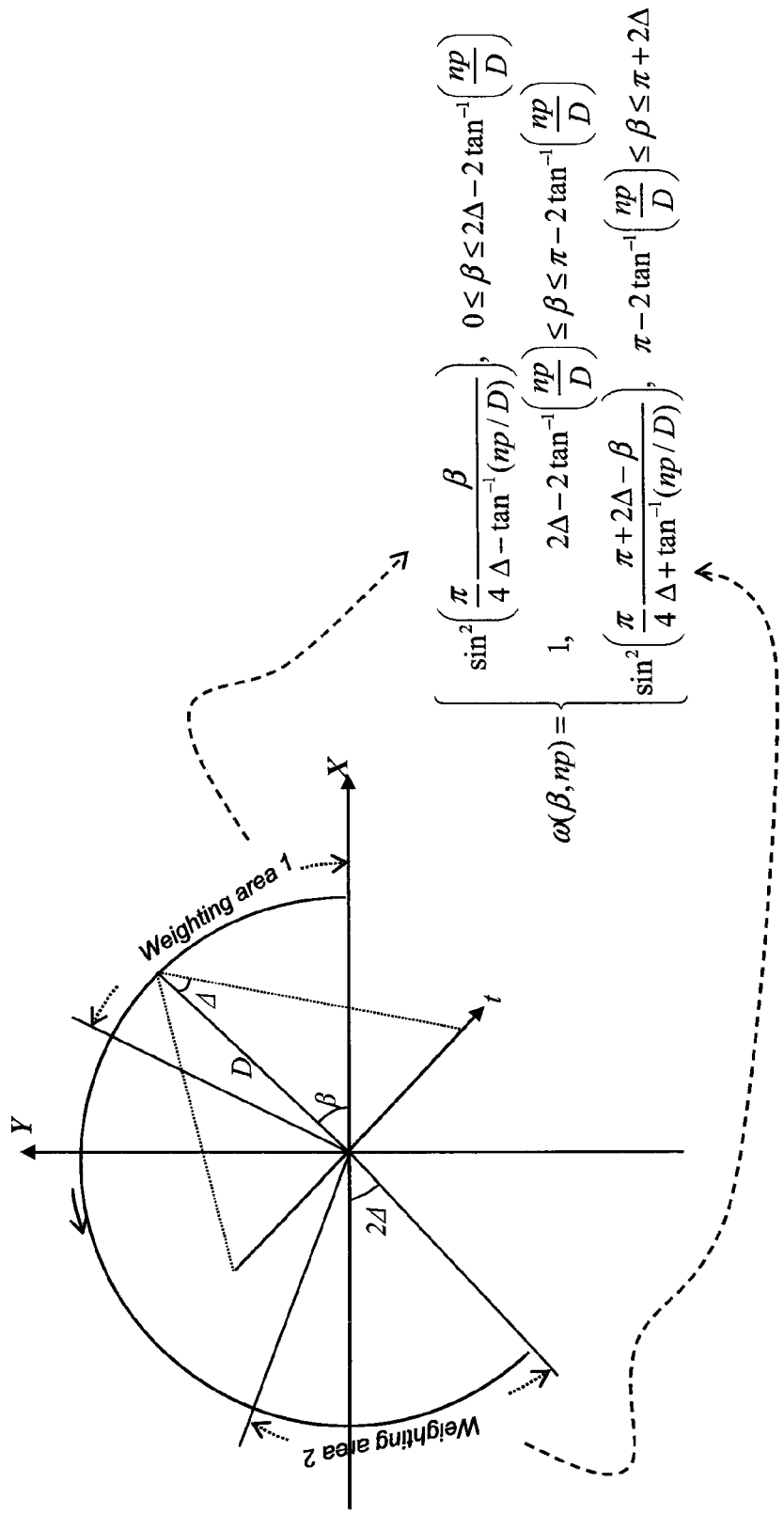
FIG. 4 is a diagram showing a top view of angular assignments and showing weighting calculations used over portions of the scan.

FIG. 4 is a top view showing the plane of the circular partial scan used as the orbit for CBCT exposure, with the partial scan angle from 0 to 180 degrees+2Δ. Of particular interest are the weighting coefficients ω applied over three angular areas, weighting area 1, weighting area 2, and the angles between. To compensate for redundant data readings over the angles corresponding to weighting areas 1 and 2, the weightings shown in FIG. 4 are conventionally applied to the data. A weighting coefficient ω of 1 applies for the scan angles between weighting areas 1 and 2, since there is no data redundancy over this angular span.

Figure 5:
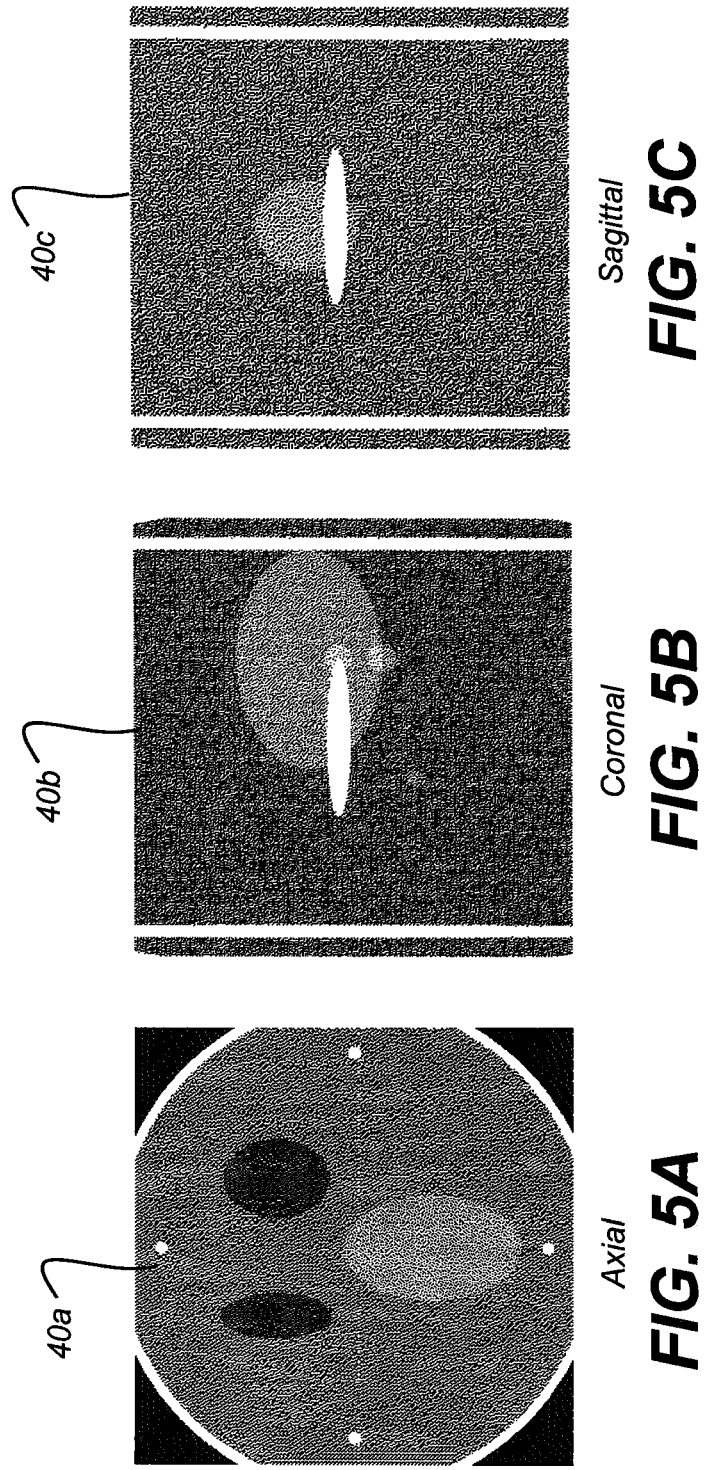
FIGS. 5A-5C show plan views of the Shepp-Logan phantom from different sectional views.

With respect to the present disclosure, the truncation analysis used to demonstrate aspects of the present invention, in various embodiments, can be applied to the well-known Shepp-Logan phantom that is familiar to those skilled in the CBCT image reconstruction arts and shown in FIGS. 5A-5C. An axial cross-section 40a based on this phantom is shown at left. Coronal and sagittal cross sections 40b and 40c are at the middle and right in this figure.

Figure 6:
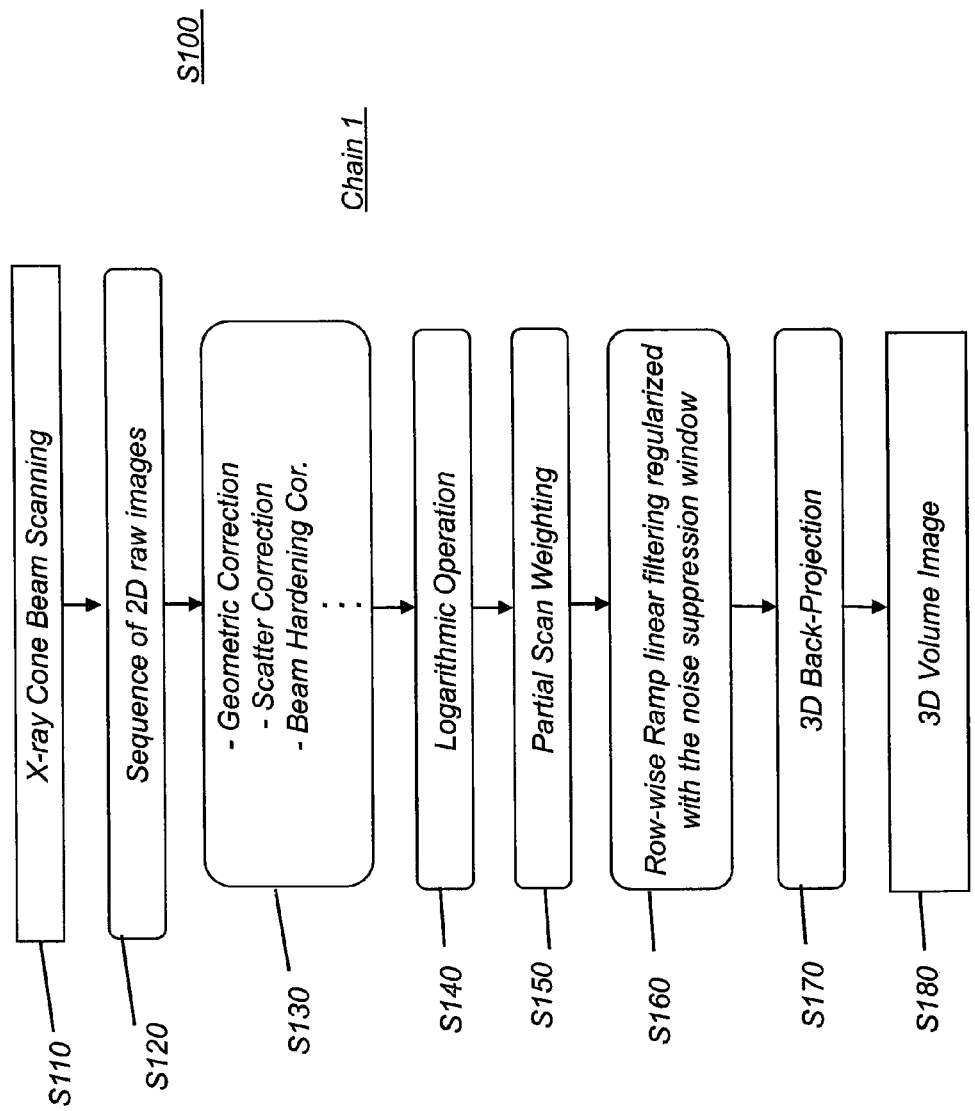
FIG. 6 is a logic flow diagram for forming a 3-D volume image in conventional processing, without truncation processing.

The logic flow diagram of FIG. 6 shows a conventional image processing sequence S100 for CBCT reconstruction using partial scans, labeled Chain 1. Scanning step S110 directs cone beam exposure toward the subject, enabling collection of a sequence of 2-D raw data images for projection over a range of angles in an image data acquisition step S120. An image correction step S130 then performs processing for geometric correction, scatter correction, and beam hardening. A logarithmic operation step S140 obtains the line integral data that is used for conventional reconstruction methods, such as the FDK (Feldkamp, Davis, and Kress) method well-known to those skilled in the volume image reconstruction arts. A partial scan weighting step S150 then executes the weighting for values over varying angular ranges, as described with reference to FIG. 4. A ramp filtering step S160 follows, providing row-wise linear filtering that is regularized with the noise suppression window. A back projection step S170 is then executed and an image formation step S180 reconstructs the 3-D volume image using one or more of the non-truncation corrected images. The reconstructed 3-D image can be stored in a computer-accessible memory and displayed.

Figure 7C:
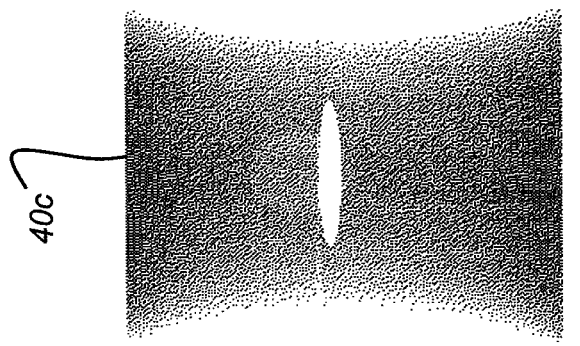
FIGS. 7A-7C show plan views of the Shepp-Logan phantom when truncation occurs.
Figure 7B:
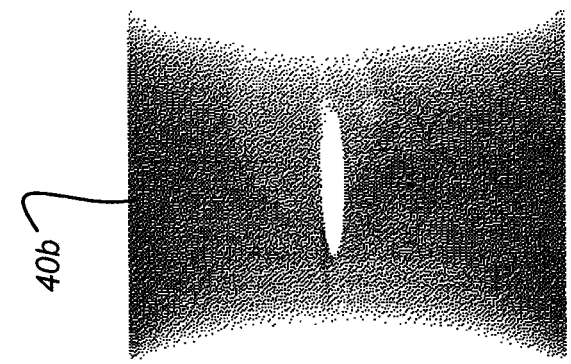
Figure 7A:

Image processing sequence S100 of FIG. 6 is suitable for images, provided that there is no truncation of the image. The simulated reconstructed images in FIGS. 7A-7C show the effect of image truncation on axial, coronal, and sagittal cross-section images 40a, 40b, and 40c, respectively. The example shown is for images obtained over 200 projections, from the approximate range [0, 200 degrees]. It is noted that truncation effects are not improved when an increased number of angular projections is used. For example, a full 360 degree scan shows the same image degradation as that shown in FIGS. 7A-7C.

Truncation Processing

Figures 8A, 8B:
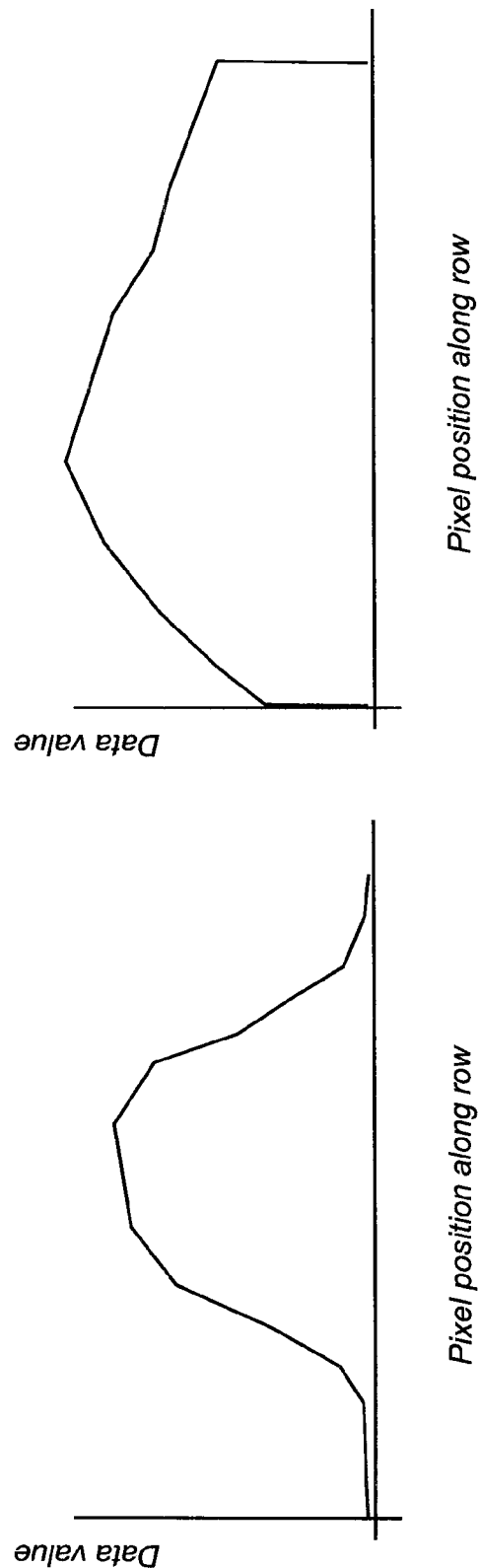
FIG. 8A shows an example graph of untruncated data.
FIG. 8B shows an example graph of truncated data.
Figure 8C:
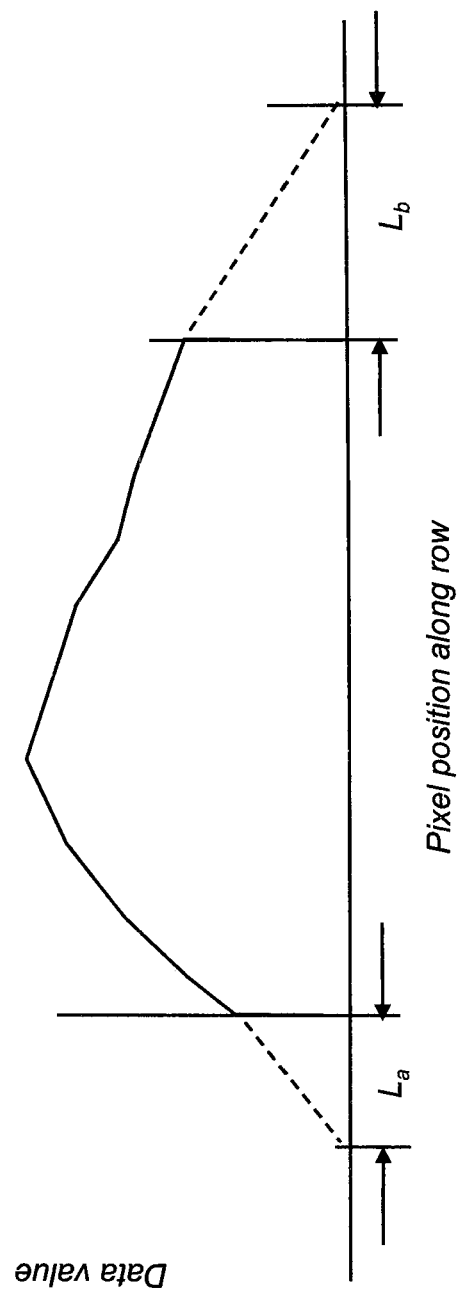
FIG. 8C shows an example graph of truncated data with extended, extrapolated portions.

FIGS. 8A and 8B are graphs that compare normal, untruncated data for a row of image pixels with truncated data. Truncation of the image is characterized by the absence of any near-zero image data for pixels along one or both edges of the detector. When processed with an image filter, for example, the truncated data behaves poorly, with ringing or other undesirable response effects. The graph of FIG. 8C shows how interpolation can be performed to form a corrected truncated image in one embodiment. For this purpose, the length of the line of pixels is considered to be extended on each side of the pixel row with extrapolated values $L_a$ and $L_b$. For processing, the extended data is gives an appropriate length to the line of data, such as using a power of two ($2^n$) for example. Zero-padding can be used, for example. It is noted that truncation may be only on one side of the image, so that only one of extrapolated values $L_a$ and $L_b$, is used.

Conventional extrapolation can use techniques such as a spline fit or other methods for smoothing truncated edge data. As noted previously, among the problems caused by conventional methods for extrapolation are computational inefficiency and inaccurate reconstruction. These can be largely due to the effects of abrupt transitions between the measured and extrapolated data, and the high-frequency image content that results. Embodiments of the present invention address the extrapolation problem using a truncation processing scheme that uses a cosine function.

FIG. 9 shows how this extrapolation is performed by applying a row-dependent cosine function to each value in the extension length for a truncated row of pixels that has been identified in one embodiment. The original truncated data f(n) shown at 26 is:

$$f(n):n=\{1,2,\ldots N\}$$

Processed data g(t) at 28 has added portions preceding ($f_1(n_1)$) and following ($f_2(n_2)$) the original truncated data:

$$g(t)=[f_1(n_1),f(n),f_2(n_2)] \text{ wherein } t=\{1,2,\ldots,N+2L\}$$

For the truncation processing shown in FIG. 9, the assigned extension length value L is determined heuristically, and may be varied from one line or row to the next according to the row location in the truncated image, as described in more detail subsequently.

Figure 10:
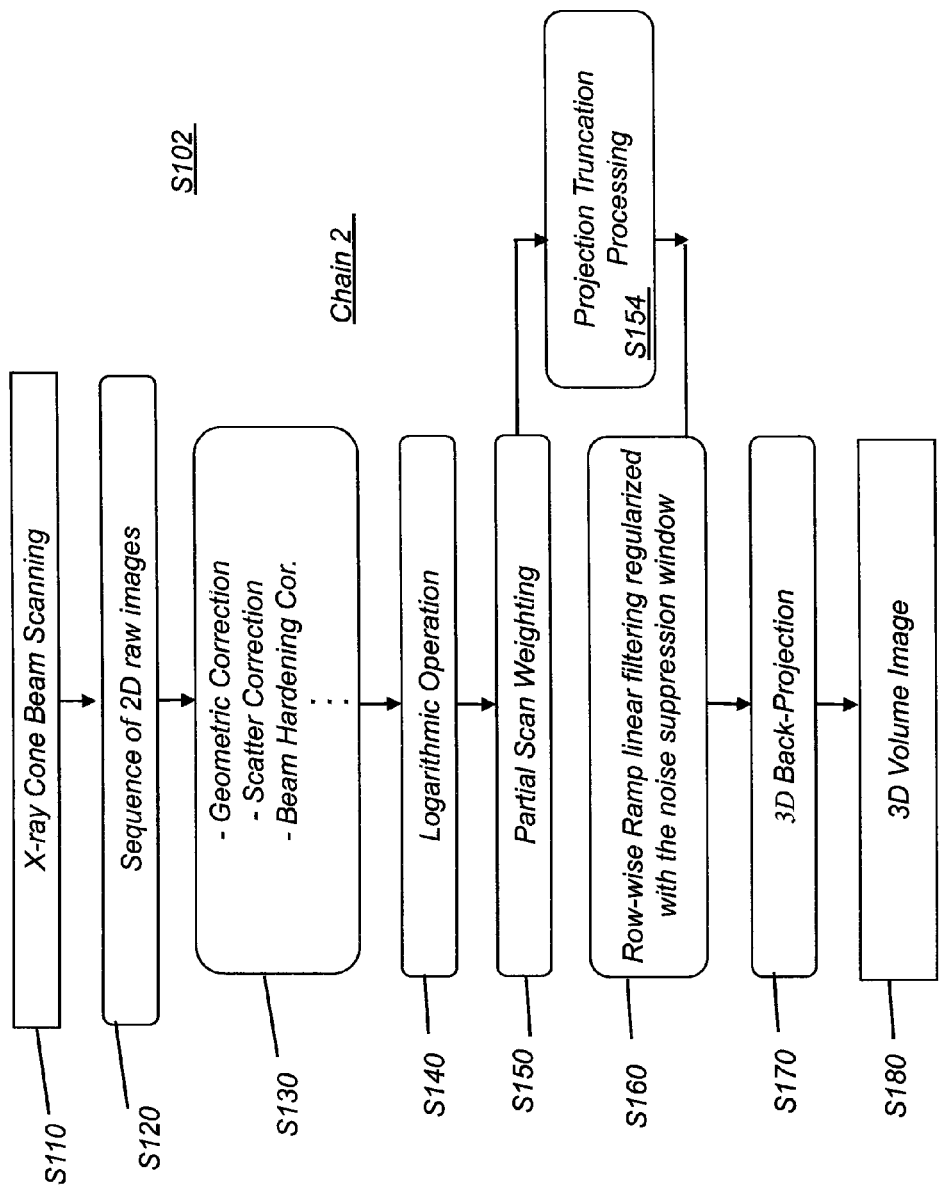
FIG. 10 is a logic flow diagram for forming a 3-D volume image using truncation processing according to one embodiment of the present invention.
Figure 11:
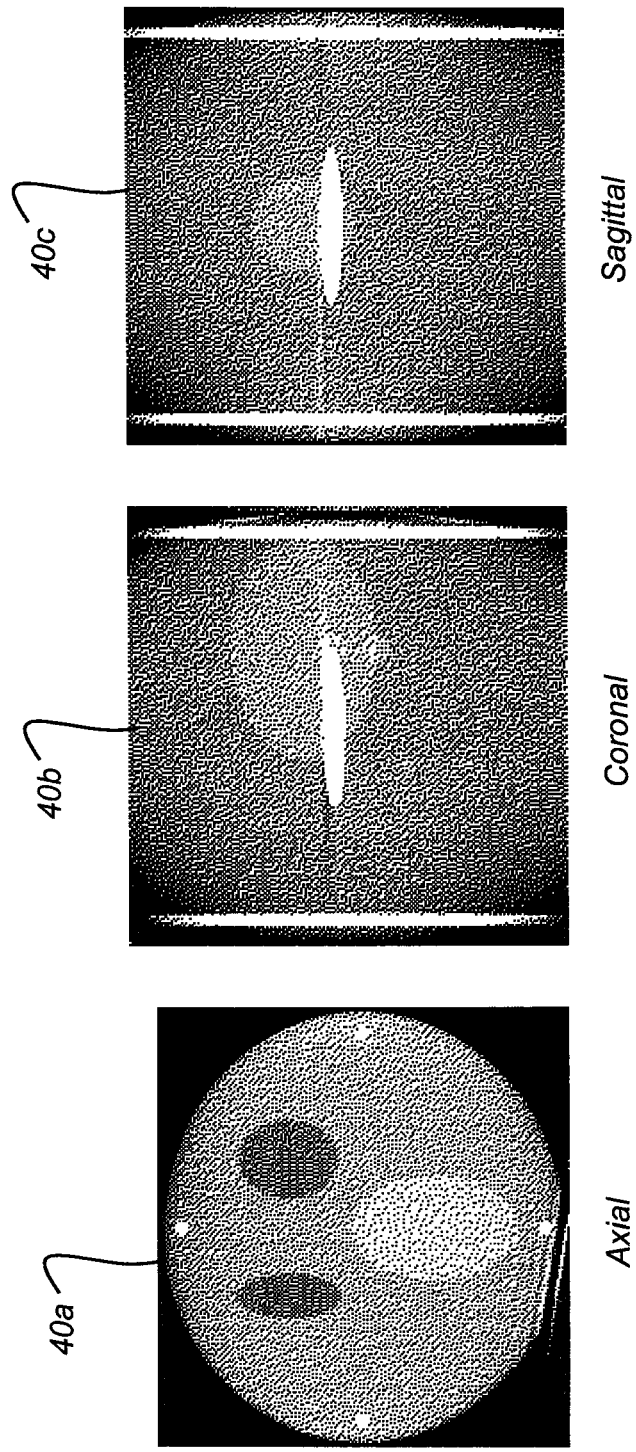
FIGS. 11A-11C show plan views of the Shepp-Logan phantom following a first sequence of truncation processing.

The logic flow diagram of FIG. 10 shows an image processing sequence S102, labeled Chain 2, which includes an added projection truncation processing step S154. In this step, truncated image data is detected and, where found, the identified truncated images are modified using extrapolated data as described with respect to FIG. 9. FIGS. 11A-11C show the imaging results obtained using truncation processing step S154 on the truncated image data that was shown in FIGS. 7A-7C. While there is improvement for truncated image content, artifacts are particularly perceptible in axial cross-section 40a and, to a lesser extent, in coronal cross-section 40b. These artifacts are a result of an insufficient number of projection angles, rather than due to truncation.

Extended Partial Scan Weighting

Image artifacts resulting from a limited range of scan angles, such as that shown in FIGS. 11A-11C, can be inherent to the image capture process in some cases. When imaging the human knee, for example, the possible range of angles for scanning is constrained for a standing patient. To compensate, embodiments of the present disclosure modify the conventional weighting scheme described earlier with reference to FIG. 4.

Figure 12:
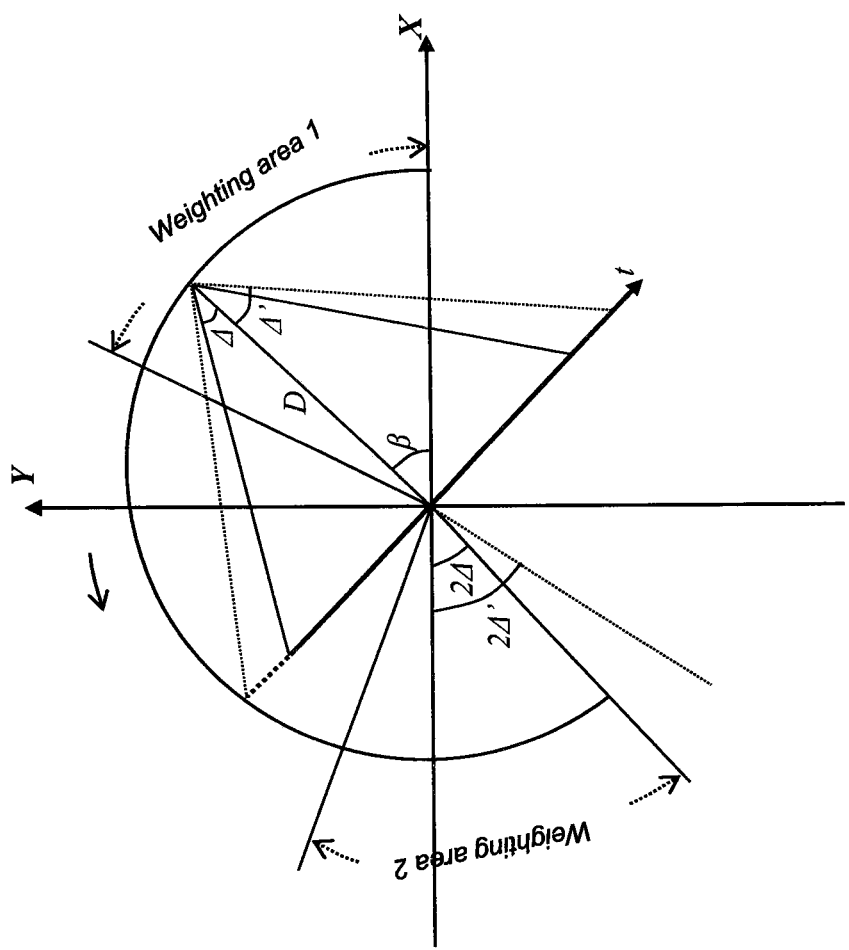
FIG. 12 is a top view showing geometry of extended partial scan weighting according to one embodiment.
Figure 13:
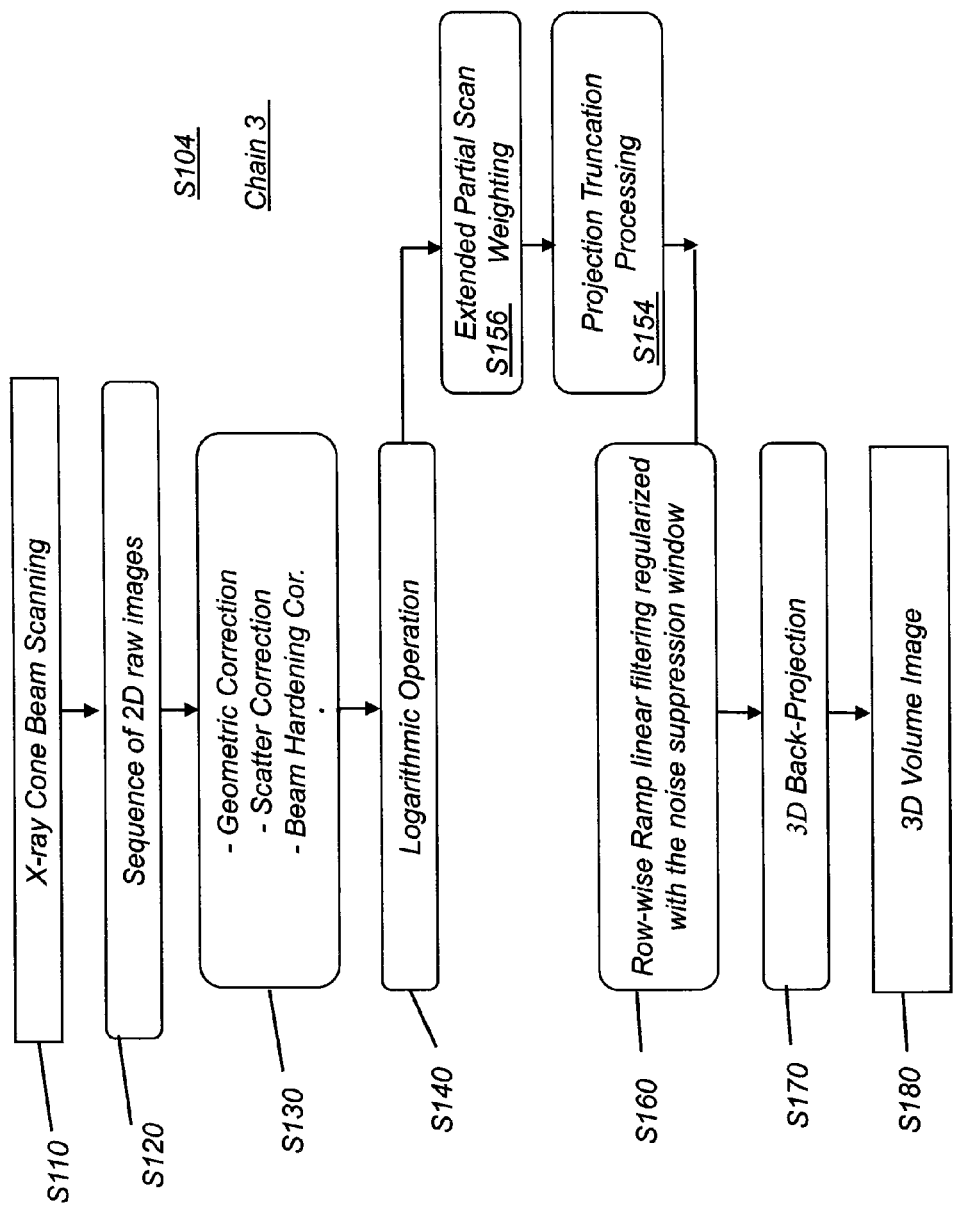
FIG. 13 is a logic flow diagram for forming a 3-D volume image using truncation processing according to an alternate embodiment of the present invention.
Figure 14:
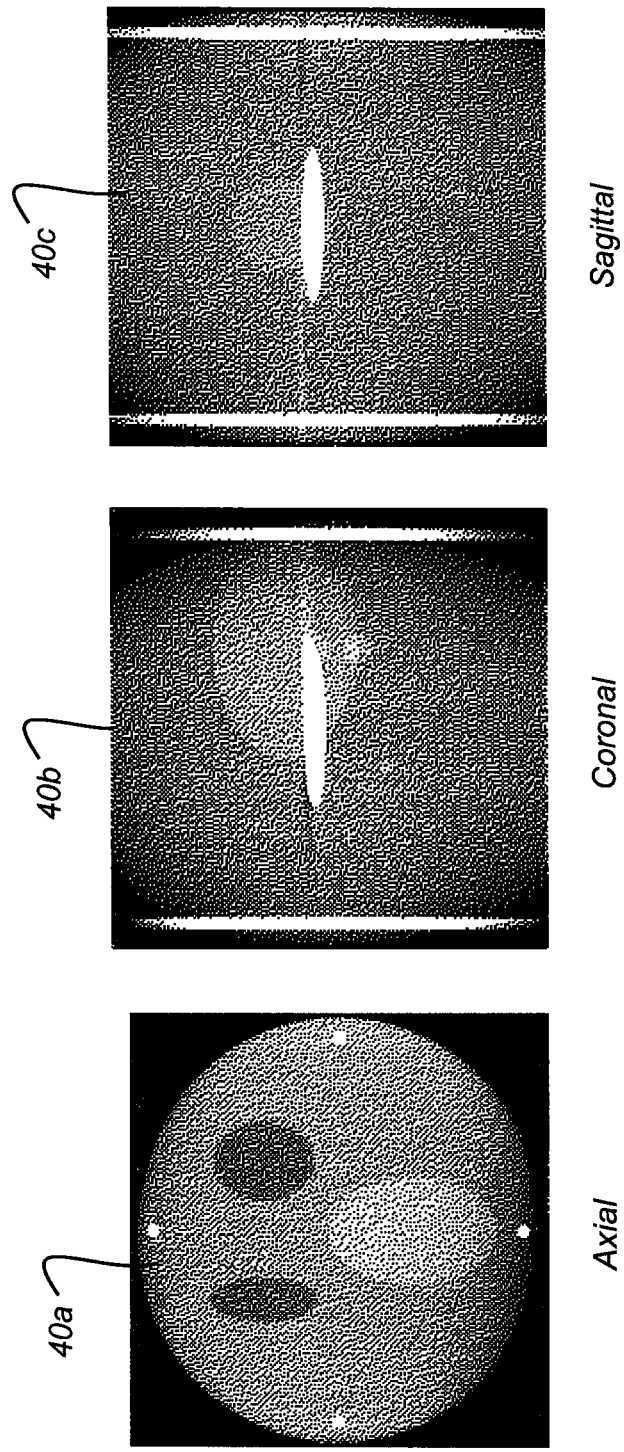
FIGS. 14A-14C show plan views of the Shepp-Logan phantom following a second sequence of truncation processing using extended partial scan weighting.

As shown in FIG. 12, the fan angle used in calculation, here, value Δ, is increased by a few degrees over the actual fan angle defined on the scanning plane +y. In FIG. 12 notation, the increased fan angle is labeled Δ'. This, in turn, changes the effective size of weighting areas 1 and 2. In one embodiment, this technique effectively modifies the number of scan angles from 200 to 208, for example. The logic flow diagram of FIG. 13 shows the modified image processing sequence S104, labeled Chain 3, that adds an extended partial scan weighting step S156. Improved processing results using this modification are shown in FIGS. 14A-14C.

Adaptive Projection Truncation Processing

Figure 15:
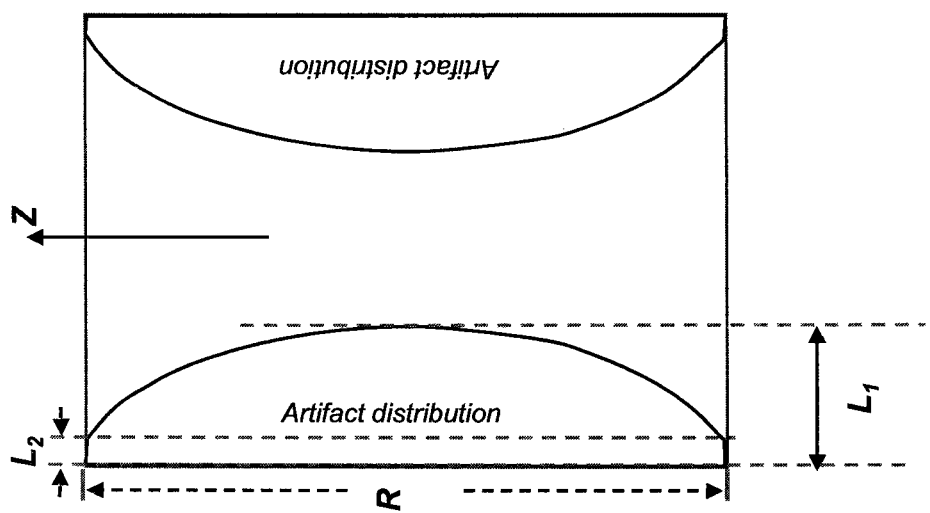
FIG. 15 is a schematic diagram that shows the truncation pattern in a sagittal or coronal cross-section and shows how adaptive projection truncation is executed.

As was shown in the coronal and sagittal views of FIGS. 7B and 7C, truncation artifacts vary along the axis, so that truncation is more pronounced along the middle of the image than toward top and bottom edges. The distribution of truncation artifacts has been found to follow an approximate cosine function. FIG. 15 shows, in schematic form, how the shape of the perceptible truncation artifacts varies with rows R of the coronal or sagittal image.

Figure 16:
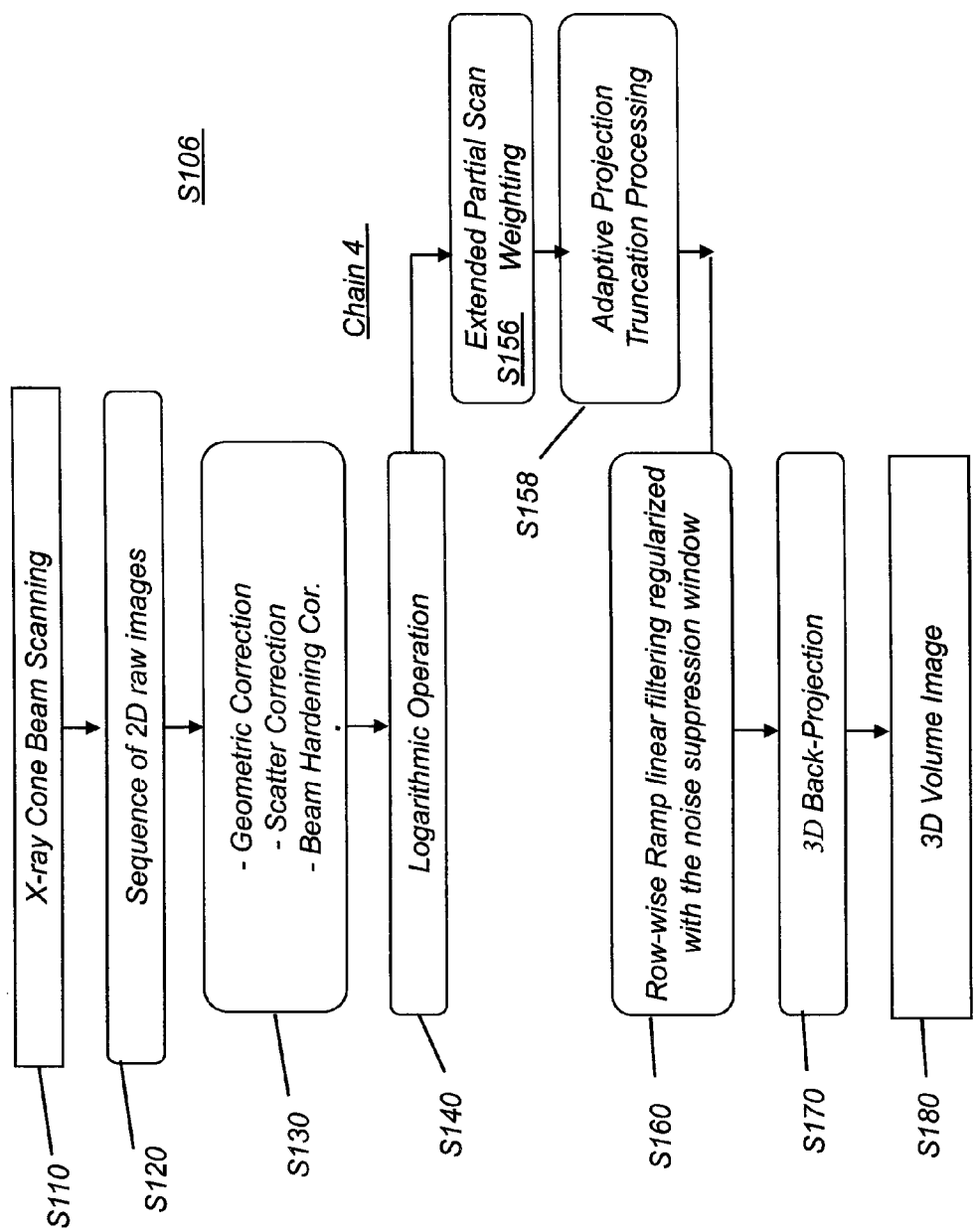
FIG. 16 is a logic flow diagram for forming a 3-D volume image using another sequence for truncation processing according to another alternate embodiment of the present invention.

In FIG. 15, the length of row n is given as $L_m$. Index n gives the row number. A heuristically defined function f is used with assigned $L_1$ and $L_2$ values that indicate the minimum and maximum values for truncation, as shown. The logic flow diagram of FIG. 16 shows an image processing sequence S106, labeled Chain 4, which uses an adaptive projection truncation processing step S158 in this way. FIGS. 17A-17C show plan views of the Shepp-Logan phantom following truncation processing using extended partial scan weighting and adaptive projection truncation processing.

The examples given herein describe processing for truncated projection images in which truncation occurs along both edges of the 2-D projection image. It is noted that similar processing is executed, with corresponding modifications, where there is image data truncation only along one edge of the image.

Results Comparison

FIGS. 18A-18B, 19A-19B, and 20A-20B compare the phantom profiles with computed horizontal line and vertical line (or column) profiles with projection truncation processing only, using image processing Chain 2 (FIG. 10) and with extended partial scan weighting and adaptive truncation processing using image processing Chain 4 (FIG. 16). In each of these examples, the Chain 4 processing clearly out-performs the Chain 2 processing.

Figure 18B:
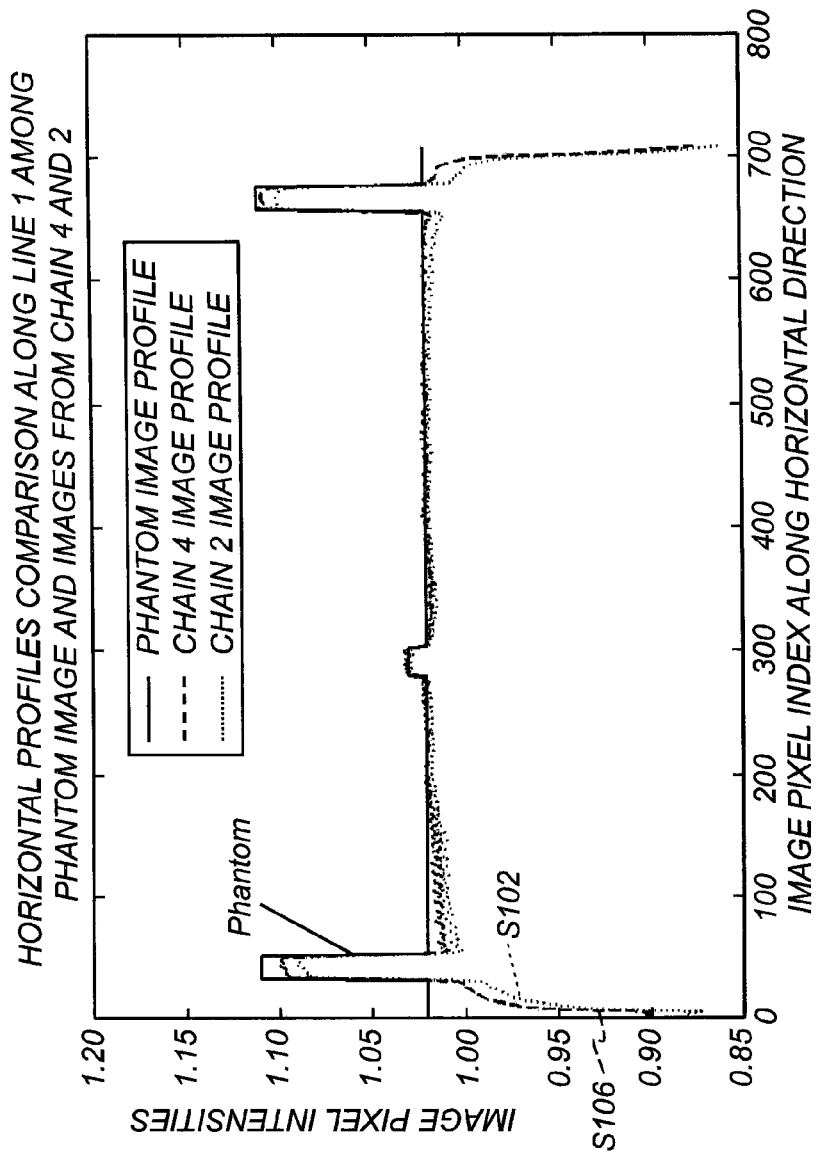
FIG. 18B is a graph that shows results of truncation processing using various processing sequences for the line shown in FIG. 18A.
Figure 18A:
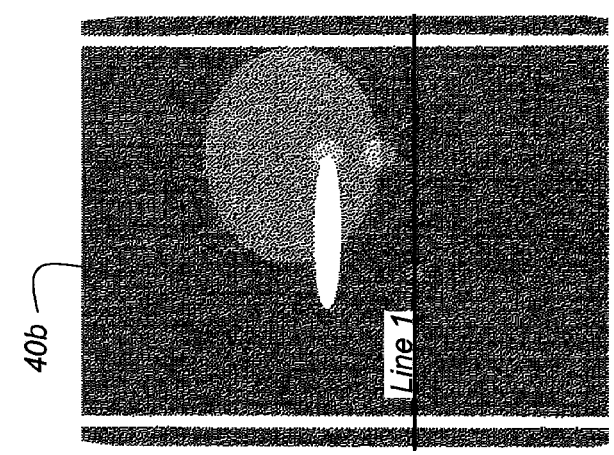
FIG. 18A shows a single horizontal line of a phantom image.

The graph of FIG. 18B shows horizontal profiles for the original Shepp-Logan phantom data and for data from image processing sequences S102 and S106 along one line of the phantom image, shown as Line 1 in FIG. 18A.

Figure 19B:
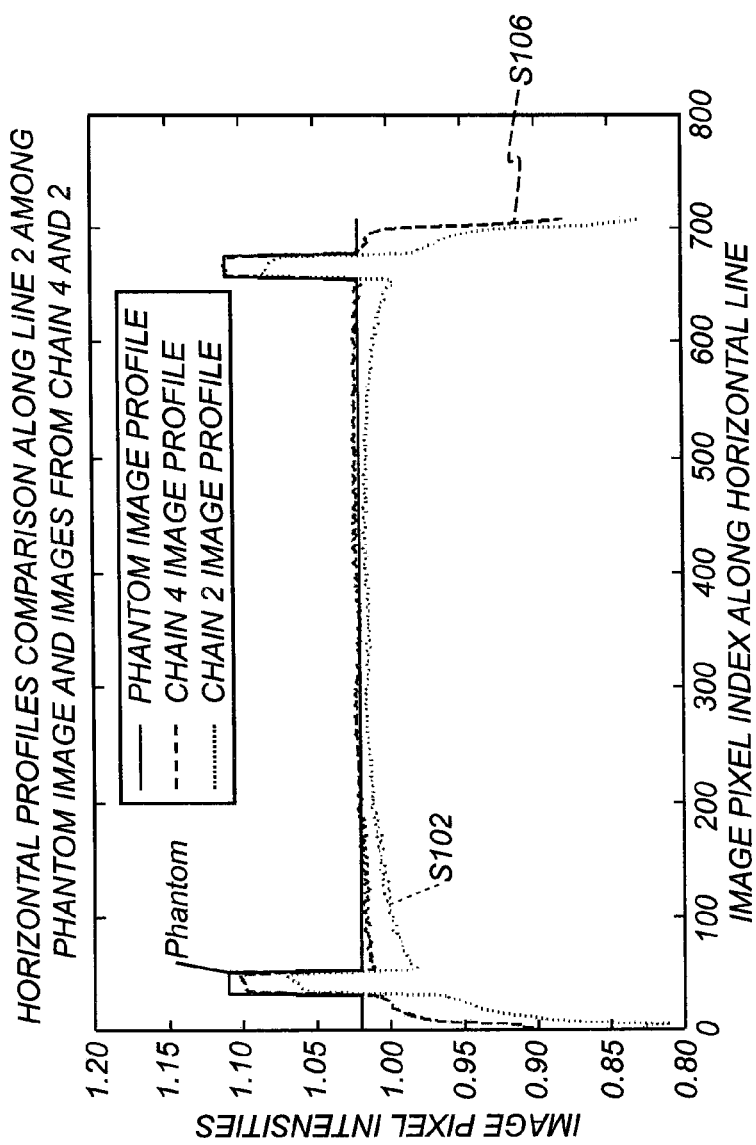
FIG. 19B is a graph that shows results of truncation processing using various processing sequences for the line shown in FIG. 19A.
Figure 19A:
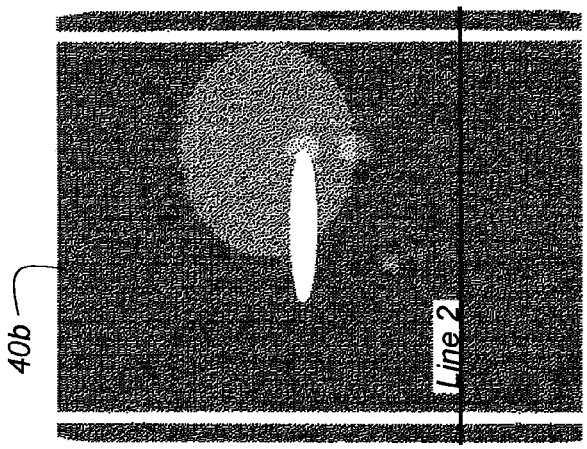
FIG. 19A shows a single horizontal line of a phantom image.

The graph of FIG. 19B shows horizontal profiles for the original Shepp-Logan phantom data and for data from image processing sequences S102 and S106 along another line of the phantom image, shown as Line 2 in FIG. 19A.

Figure 20B:
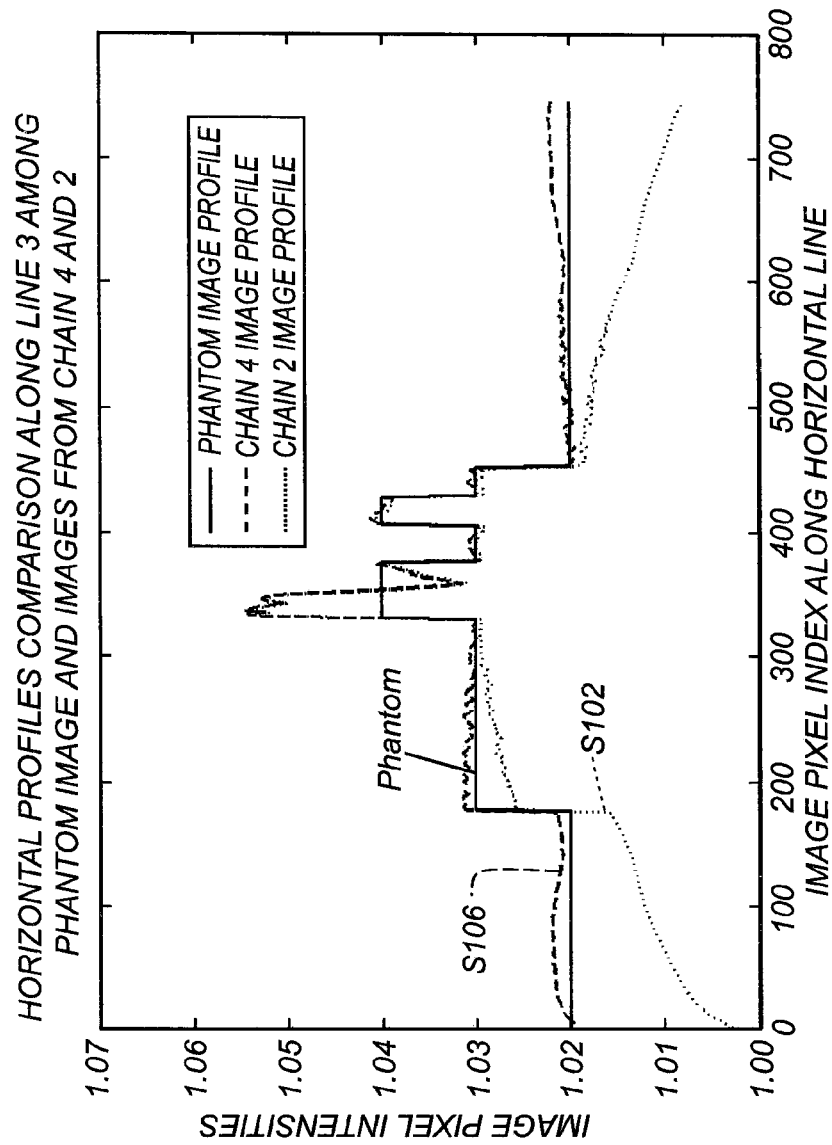
FIG. 20B is a graph that shows results of truncation processing using various processing sequences for the line shown in FIG. 20A.
Figure 20A:
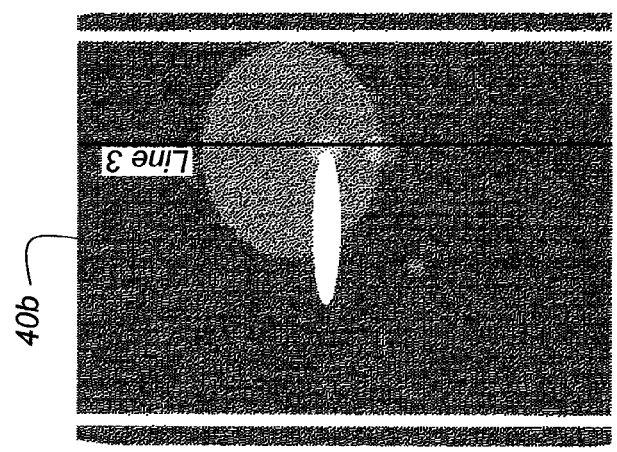
FIG. 20A shows a single vertical line of a phantom image.

The graph of FIG. 20B shows vertical profiles for the original Shepp-Logan phantom data and for data from image processing sequences S102 and S106 along one vertical line of the phantom image, shown as Line 3 in FIG. 20A.

In practice, a series of projection images for a particular subject may include only a subset of images that are truncated, while other images in the series do not suffer from truncation. In such a case, un-truncated images are processed using conventional projection image processing (Chain 1), as described with reference to FIG. 6. The truncated images are then processed using one of image processing sequences S102 (Chain 2) in FIG. 10, S104 (Chain 3) in FIG. 13, or S106 (Chain 4) in FIG. 16.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

20. Subject
22. Radiation source
24. DR detector
26. Truncated data
28. Processed data
30. Computer
32. Memory
34. Display
40a. Axial cross-section
40b. Coronal cross-section
40c. Sagittal cross-section
S100. Image processing sequence, Chain 1
S102. Image processing sequence, Chain 2
S104. Image processing sequence, Chain 3
S106. Image processing sequence, Chain 4
S110. Scanning step
S120. Image data acquisition step
S130. Image correction step
S140. Logarithmic operation step
S150. Partial scan weighting step
S154. Projection truncation processing step
S156. Extended partial scan weighting step
S158. Adaptive projection truncation processing step
S160. Ramp filtering step
S170. Back projection step
S180. Image formation step
A. Rotation axis
β. Scan angle
Δ Cone angle
γ. Cone angle

What is claimed is:

1. A method for 3-D volume image reconstruction of a subject, comprising:
   obtaining a plurality of 2-D projection images over a range of scan angles using partial scan cone-beam computed tomography;
   identifying, by a computer processor, one or more truncated projected images along a horizontal direction in one or more truncated images across all of the view of the plurality of 2-D projection images;
   forming, by the computer processor, from each of the one or more truncated projected images, a corrected truncated projection image by a repeated process comprising:
   (i) adaptively assigning an extension length for the rows that are truncated in the current truncated projection images;
   (ii) identifying the truncated projection view that has the largest extended length;
   (iii) recalculating the scanning fan angle based on the largest extended length calculated in step (i);
   (iv) applying an adjusted weighting factor based on the recalculated scanning fan angle;
   (v) extending the truncated projection image data for the rows that are truncated in the current truncated projection image by applying a cosine function to each value in the extension length; and reconstructing, by the computer processor, the 3-D volume image incorporating the corrected truncated projection images;

wherein forming the corrected truncated projected image further comprises adjusting a weighting factor by increasing an x-ray fan angle value to calculate weighting coefficients for an increased range of angles; and wherein the cosine function is a first cosine function and wherein assigning the extension length comprises applying a second cosine function according to row location in the projected image.

2. The method of claim 1 wherein the extension length is heuristically determined.

3. The method of claim 1 further comprising displaying or transmitting the reconstructed 3-D volume image.

4. The method of claim 1 further comprising storing the reconstructed 3-D volume image in a computer-accessible memory.

5. The method of claim 1 wherein the cosine function is row-dependent in the projected image.

* * * * *